Patented Mar. 27, 1951

2,546,239

UNITED STATES PATENT OFFICE 2,546,239

METHOD OF PREPARING ZINC SULFIDE PHOSPHOR

Siegfried Rothschild, London, England, assignor to The Hartford National Bank and Trust Company, Hartford, Conn., as trustee No Drawing. Application December 6, 1947, Serial No. 790,241. In Great Britain July 17, 1941

Section 1, Public Law 690, August 8, 1946
Patent expires July 17, 1961

7 Claims. (Cl. 252—301.6)

For the manufacture of zinc sulphide, which remains phosphorescent for a length; period, it is necessary to use zinc sulphide of a very high grade of purity as raw material. Such zinc sulphide has generally been prepared by precipitation from specially purified solutions of zinc salts. This process proved to be complicated and costly. The practical application of phosphorescent zinc sulphide has therefore been rather restricted.

According to the present invention a less expensive method for the preparation of zinc sulphide with a considerable afterglow comprises heating purest zinc oxide with pure sulphur in presence of a halide compound like sodium chloride slowly up to about 800° C. and keeping it at this temperature for an hour or longer. The proportion of zinc oxide to sulphur should be about 50:50. The resulting product is washed with diluted acid, for instance 2% hydrochloric acid and water, to remove zinc oxide left unreacted and extract zinc sulphate and any other salts, which may be present. The dried sulphide is mixed with the activating metal compound and halide salts, then heated to temperatures exceeding 800° C. The activating metal compound is a copper activator, as disclosed in my co-pending application Serial No. 790,242. The first firing may be carried out in air, whilst the second firing is made in air or preferably in an inert atmosphere like nitrogen. No reducing gases must be present. The duration of the firing depends on the quantities used, and may be from one to several hours. After the second firing the material is again washed with distilled water and eventually elutriated.

The volume of the mixture shrinks to about one third of the previous volume after the first firing. This is advantageous as more material may be packed into the crucible for the second more expensive firing at higher temperatures and in an inert atmosphere. The firing in two stages provides also the possibility for a further purification of the zinc oxide sulphure mixture. Metal compounds eventually present as impurities either evaporate or condense on top of the mixture in the crucible or form heavy particles in the interior of the mixture, which can be removed by elutriation when the product is washed after the first heating. If the material has the necessary degree of purity, it should show after the first firing, when irradiated with ultra-violet light a bluish fluorescence with a peak at about 460 m$\mu$, indicating that no heavy metal compounds are present. Any dark or different coloured parts should be removed.

For the first firing alkali halogenides may be added to the zinc oxide sulphur mixture. For the second firing the type of halide salts depends on the kind of colour which has to be produced. A phosphorescent zinc sulphite with a peak at a wavelength of about 520 m$\mu$ is obtained when alkali halogenides are added and about 2% of sulphur, while a more yellowish shade with a peak at about 540 m$\mu$ is obtained by the use of earth alkali halogenides with an addition of 1% zinc dust. A combination of different halide salts is advantageous. Materials with a maximum still farther in the yellow or orange part of the spectrum are obtainable by the addition of cadmium compounds, for instance cadmium sulphide before the material is heated for the second time.

The presence of halide salts in the zinc oxide sulphur mixture is necessary for several reasons. During the first firing the halide salts promote the reaction between zinc oxide and sulphur and the crystallisation of the zinc sulphide formed. Heavy metal oxides eventually present as impurities react with the alkali halides forming salts, which evaporate or can be removed in the manner already described. Finally is the addition of halide salts necessary to obtain the bluish fluorescence, which permits the purity test of the material after the first firing. During the second firing the halide salts act as known per se in completing the crystallisation and developing the phosphorescent properties as desired.

Commercial grades of zinc oxide or sulphur do not give satisfactory results in consequence of the presence of impurities. A suitable zinc oxide may be prepared by burning purest zinc metal and collecting the zinc oxide fumes, discarding the parts which come over first and at the end. Sulphur of the necessary purity may be prepared by distillation of resublimed sulphur. All other chemicals should be of the same standard of highest purity.

The following non-limitative example illustrates the preparation of a phosphorescent zinc sulphide according to the present invention.

500 g. ZnO, 500 g. S and 50 g. NaCl are well mixed and slowly heated with admission of air up to 800° C. and kept at this temperature for one hour. The resulting product is investigated under an ultraviolet lamp and all parts not showing a bluish fluorescence are discarded. The product is washed first with 8 litres of 2% HCL, and afterwards with distilled water. Particles of a higher density than the average density of the zinc sulphide are removed by elutriation. The dried material is well mixed with 60 g. BaCl$_2$, 12 g. NaCl, 5 g. zinc dust, 0.1 g. CuCl₂, and 2H₂O. This mixture is fired during 2 hours at a temperature of 1200° C. in an inert atmosphere like nitrogen. The product is then washed again with distilled water. The dried powder shows after illumination a yellow-green phosphorescence.

In British Specification No. 495,774 the preparation of a fluorescent metallic sulphide for cathode ray tubes by heating the oxide or hydroxide of a metal with sulphur in an atmosphere of hydrogen or sulphuretted hydrogen to a temperature in excess of 400° C. in the presence of a heavy metal has been described.

Fluorescent materials emit light during the excitation with cathode rays or other ways. When the excitation ceases, the light emission drops more or less instantaneously to zero. This property is essential when the material is to be used as screen material in cathode ray tubes for television purposes.

The material prepared according to the present invention is however phosphorescent, that is to say, it stores energy during the excitation and gradually releases the same after the excitation has ceased. The capability to phosphorescence is connected with a particular crystal structure entirely different from the structure of a merely fluorescent material. For the production of a phosphorescent zinc sulphide the presence of halide salts and a prolonged firing time are essential, as described in the present invention.

In British Specification No. 495,174, no halide salts are mentioned and the heating process described extends only over a time of the order of three minutes. An essential feature of the present invention is further the preparation of the phosphorescent material in two stages; the advantage of this procedure have already been described.

The heating of the fluorescent material according to British Specification No. 495,774 is carried out in an atmosphere of H₂ or H₂S. Such a reducing atmosphere is entirely unsuitable for the preparation of a phosphorescent zinc sulphide. It has been observed that a copper activated zinc sulphide, when heated in a reducing atmosphere at 1200°, shows a bluish fluorescence and no appreciable phosphorescence at all. For the preparation of a phosphorescent zinc sulphide according to the present invention no reducing gases must be present.

The structure and the properties of the phosphorescent zinc sulphide and the methods producing the same as hereinbefore described differ therefore substantially from the fluorescent sulphide as described in British Specification No. 495,774.

I claim:

1. A process for the production of a phosphorescent zinc sulphide which comprises the steps of mixing zinc oxide and sulphur in a proportion to form zinc sulphide with an excess of sulphur, heating the mixture with an alkali halide to approximately 800° C., maintaining the mixture at substantially 800° C. for at least about one hour, washing the so-heated material with dilute acid and then water to thereby remove unreacted zinc oxide from the so heated material, mixing a copper activator and a halide with the so treated material, and heating the so formed mixture in a non-reducing atmosphere to a temperature greater than about 800° C.

2. A process for the production of a phosphorescent zinc sulphide which comprises the steps of mixing zinc oxide and sulphur in a proportion to form zinc sulphide with an excess of sulphur, heating the mixture with an alkali halide to approximately 800° C., maintaining the mixture at substantially 800° C. for at least about one hour, washing the so-heated material with dilute acid and then water to thereby remove unreacted zinc oxide from the so heated material, mixing an alkali halogenide and about 2% of sulphur by weight with the so treated material, and heating the so formed mixture in a non-reducing atmosphere to a temperature greater than about 800° C.

3. A process for the production of a phosphorescent zinc sulphide which comprises the steps of mixing zinc oxide and sulphur in a proportion to form zinc sulphide with an excess of sulphur, heating the mixture with an alkali halide to approximately 800° C. maintaining the mixture at substantially 800° C. for at least about one hour, washing the so-heated material with dilute acid and then water to thereby remove unreacted zinc oxide from the so heated material, mixing an alkali earth halogenide and about 1% of metallic zinc by weight with the so treated material, and heating the so formed mixture in a non-reducing atmosphere to a temperature greater than about 800° C.

4. A process for the production of a phosphorescent zinc sulphide which comprises the steps of mixing zinc oxide and sulphur in a proportion to form zinc sulphide with an excess of sulphur, heating the mixture with an alkali halide to approximately 800° C., maintaining the mixture at substantially 800° C. for at least about one hour, washing the so-heated material with dilute acid and then water to thereby remove unreacted zinc oxide from the so heated material, mixing an alkali halogenide and cadmium sulphide with the so treated material, and heating the so formed mixture in a non-reducing atmosphere to a temperature greater than about 800° C.

5. A process for the production of a phosphorescent zinc sulphide which comprises the steps of mixing zinc oxide and sulphur in a proportion to form zinc sulphide with an excess of sulphur, heating the mixture with an alkali halide to approximately 800° C., maintaining the mixture at substantially 800° C. for at least about one hour, washing the so heated material with acid to remove the unreacted zinc oxide, washing the acidified material with water, mixing a copper activator and a halide with the so treated material, and heating the so formed mixture in a non-reducing atmosphere to a temperature greater than about 800° C.

6. A process for the production of a phosphorescent zinc sulphide which comprises the steps of mixing approximately 500 grams of zinc oxide with approximately 500 grams of sulphur, heating the mixture with about 50 grams of sodium chloride to approximately 800° C., maintaining the mixture at substantially 800° C. for at least about one hour, washing the so heated material with hydrochloric acid, washing the acidified material with distilled water, elutriating the washed material and removing high density particles of said material, drying the so purified material, mixing the dried material with approximately 60 grams of barium chloride, approximately 12 grams of sodium chloride, approximately 5 grams of zinc dust, approximately 0.1 gram of copper chloride, and approximately 2 grams of water, and heating the so formed mixture to a temperature of about 1200° C. in an inert atmosphere for approximately two hours.

7. A process for the production of a phosphorescent zinc sulphide which comprises the steps of mixing approximately 500 grams of zinc oxide with approximately 500 grams of sulphur, heating the mixture with approximately 500 grams of sodium chloride to approximately 800° C., maintaining the mixture at substantially 800° C. for at least about one hour, irradiating the material with ultra-violet light, selecting that portion of material showing a blue fluorescence, washing said selected portion first with dilute acid and then with distilled water, elutriating the washed material and removing high density particles thereof, drying the so purified material, and mixing the dried material with approximately 60 grams of barium chloride, approximately 12 grams of sodium chloride, approximately 5 grams of zinc dust, approximately 0.1 gram of copper chloride, and approximately 2 grams of water, and heating the so formed mixture to a temperature of about 1200° C. in an inert atmosphere for approximately two hours.

SIEGFRIED ROTHSCHILD.

REFERENCES CITED

The following references are of record in the file of this patent:

UNITED STATES PATENTS

| Number | Name | Date |
|---|---|---|
| 2,310,424 | Goodman | Feb. 9, 1943 |
| 2,310,425 | Goodman | Feb. 9, 1943 |
| 2,405,031 | Goodman | July 30, 1946 |